United States Patent [19]

Fujimoto

[11] 3,761,932

[45] Sept. 25, 1973

[54] COMMUTATOR GENERATOR FOR RADIO NAVIGATION RECEIVER ALIGNMENT

[75] Inventor: Yoshiaki Fujimoto, Torrance, Calif.

[73] Assignee: Northrop Corporation, Los Angeles, Calif.

[22] Filed: Nov. 22, 1971

[21] Appl. No.: 200,685

[52] U.S. Cl. .............. 178/69.5 R, 325/58, 343/105

[51] Int. Cl. .............. H04l 7/00

[58] Field of Search .............. 325/58, 63; 343/105 R, 179; 178/69.5, 69.5 R

[56] References Cited

UNITED STATES PATENTS

| | | | |
|---|---|---|---|
| 3,555,195 | 1/1971 | Rester et al. | 178/69.5 R |
| 3,069,504 | 12/1962 | Kaneko | 178/69.5 R |
| 3,380,056 | 4/1968 | Adams et al. | 343/105 R |
| 3,594,502 | 7/1971 | Clark | 178/69.5 R |

*Primary Examiner*—Robert L. Griffin
*Assistant Examiner*—Jin F. Ng
*Attorney*—W. M. Graham et al.

[57] ABSTRACT

A commutator generator for generating a plurality of station gating signals each having different gate time. A resettable binary counter provides output timing signals which are gated with the commutator generator output signals. Control circuitry selects the number of pulses to be elapsed before changing the state of an output counter, as well as resetting the binary counter. The output counter, in turn, is coupled to a decoder which produces the commutator generator output signals. A station selector initially sets the output counter to one of the station gates. Further, a station envelope is coupled to an envelope processor to initially enable the resettable counter.

5 Claims, 11 Drawing Figures

COMMUTATOR GENERATOR FOR RADIO NAVIGATION RECEIVER ALIGNMENT

The invention relates in general to receiver alignment systems, and more particularly to an automatic synchronization commutator generator for simplifying receiver alignment.

BACKGROUND OF THE INVENTION

In hyperbolic navigation systems, a "line of position" represents a constant range difference from two transmitters. One hyperbolic navigation system known as OMEGA is a long range radio system. When fully implemented, eight strategically located terrestrial very low-frequency transmitting stations will provide worldwide coverage. The OMEGA navigation system is a hyperbolic navigation system using phase comparison of very low-frequency (10 to 14 kilohertz) continuous-wave radio signals, and can be used by the aircraft, ship, and land vehicles.

In the operation of a receiver in conjunction with the OMEGA transmitter stations, it is necessary to align the receiver so that its gates coincide with the transmitted signals. Heretofore, the receiver operator would normally spend several minutes slewing a count down counter to obtain proper station alignment. Typically either an oscilloscope or a D.C. meter indicator was utilized for this purpose. Such techniques, previously mentioned, are extremely slow and, further, require experienced operators to obtain the correct alignment.

In order to overcome the attendant disadvantage of prior art receiver alignment techniques, the present invention allows the receiver operator to automatically align the receiver gates with an OMEGA transmitter signal within a few seconds. Normally, such an operation requires a clean detected station envelope or envelopes. Moreover, should the noise-to-signal ratio become too large so that a clean envelope of the transmitter signal cannot be obtained, but the signal audio sound can be heard, the receiver can be synchronized by the operator by interjecting a simulated station envelope when the audio sound is initially heard.

SUMMARY OF THE INVENTION

The invention comprises a commutator generator for generating a plurality of station gating signals each having different gate times. A resettable counter provides output timing signals which are gated at a control circuit with the commutator generator output signals. Control circuitry selects the number of pulses to be elapsed before changing the state of an output counter as well as resetting the binary counter. The output counter, in turn, is coupled to a decoder which produces the commutator generator output signals. A station selector initially sets the output counter to one of the station gates. Further, a station envelope is coupled to an envelope processor to initially enable the resettable counter. The commutator generator allows a receiver to be aligned as soon as a station is detected.

The advantages of this invention, both as to its construction and mode of operation, will be readily appreciated as the same becomes better understood by reference to the following detailed description when considered in connection with the accompanying drawings, in which like referenced numerals designate like parts throughout the figures.

DESCRIPTION OF THE PREFERRED EMBODIMENT

Figure 1:
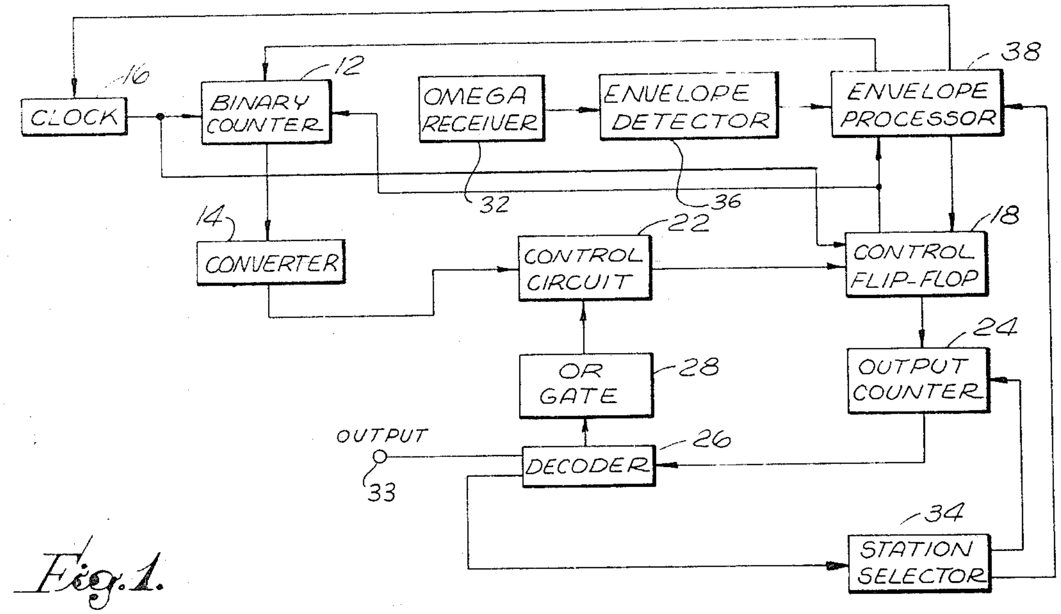
FIG. 1 depicts a block diagram of a typical commutator generator for use with an OMEGA receiver.

Referring now to the drawings, there is shown in FIG. 1 a block diagram of a commutator generator which can be used in a typical OMEGA receiver. As previously pointed out, the OMEGA navigation system will have eight transmitting stations. Each of these stations has a different gate, designated A through H. Each gate time is different and to generate all eight gates, the commutator generator of FIG. 1 is employed to generate the variable timing.

In FIG. 1, the commutator generator comprises a four-bit binary counter 12, which can be reset to zero, and has its output coupled to a binary decimal converter 14. When the binary counter 12 is not reset, the output of counter 12 is one-sixteenth of an input clock 16. The countdown of the binary counter 12 can be interrupted when a control flipflop 18 is energized. The flipflop 18 clears the counter 12 and, simultaneously, disables the counter for a 0.2 second sequence. Then a new countdown commences.

The flipflop 18 is energized sequentially by selecting the proper signal from a control circuit 22, to which the output of the converter 14 is coupled. The proper signal from the control flipflop 18 is also used to change the state of a counter 24. The output of counter 24 is coupled to a decoder 26. The decoder 26 is coupled to the control circuit 22, through an OR gate circuit 28, and selects another signal for the next operation. As long as clock 16 exists, the commutator generator is self-starting and the outputs of the decoder 26 which appear at output terminal 33 represent all eight OMEGA stations.

To initially set the generator to the OMEGA station being received at a receiver 32, a station selector 34 is coupled to the counter 24. Further, to synchronize the commutator generator with the received OMEGA signals, the signals are coupled from the receiver 32 to an envelope detector 36. The detected OMEGA signals are coupled from the detector 36 to an envelope processor 38 which is used to initially set the binary counter 12.

Figure 5:
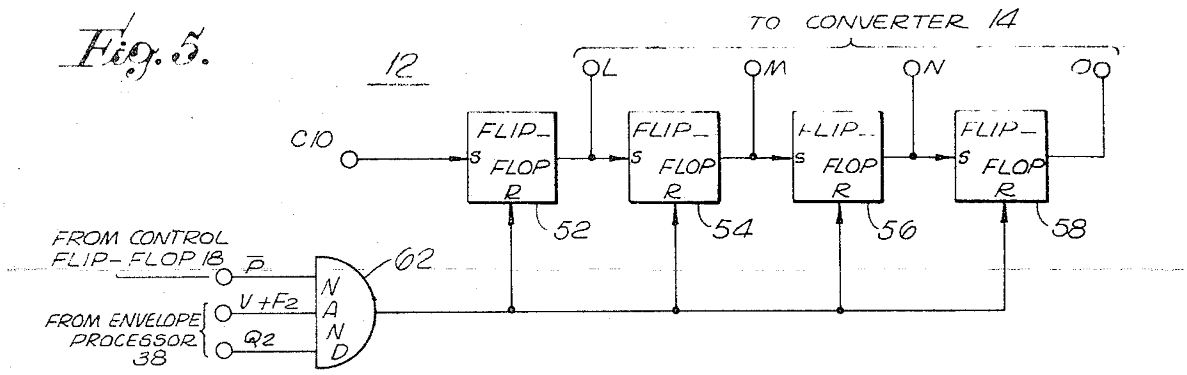
FIG. 5 illustrates a binary counter used in the commutator generator of FIG. 1 in greater detail.

Referring now to FIG. 5, the counter 12 is shown in greater detai. The counter, which is typically a four-bit binary counter, can count up to 16 clock pulses. The counter 12 is formed of four reset-set flipflops 52, 54, 56 and 58 with the output of the flipflops taken at the terminals L, M, N and O respectively. The terminals L, M, N and O are in turn coupled to the input of the converter 14.

Clock pulses from the clock 16 are represented by the symbol C10 and are coupled to the set terminal of flipflop 52. The clock pulses are used to drive the counter 12. To reset the counter, the output of a NAND gate 62 is coupled to the reset terminals of each of the flipflops 52, 54, 56 and 58. The flipflops are reset when a "1" from the NAND gate is coupled to the reset terminals and the counter can count when a "0" from the NAND gate is coupled to the reset terminals.

Input signals to the NAND gate 62 are coupled from the envelope processor 38 and the control flipflop 18. The output of the NAND gate coupled to each of the reset terminals is:

$$\text{Reset} = \overline{\bar{P} \cdot (F2 + V) \cdot Q_2}\text{; or}$$

$$\text{Reset} = P + \overline{(F2 + v)} + \overline{Q2}$$

The terms P, F2, V and Q2 will be explained in greater detail in the discussion of the envelope processor 38 and the flipflop 18.

As previously pointed out, the output of binary counter 12 is one-sixteenth of an input clock. The output of the counter 12 is coupled to converter 14 which is typically a conventional excess-3 to decimal decoder. The truth table for the converter 14 is as follows:

| INPUT TO CONVERTER 14 O N M L | OUTPUT OF CONVERTER 14 |
|---|---|
| 0 0 0 0 | |
| 0 0 0 1 | |
| 0 0 1 0 | |
| 0 0 1 1 | 0 |
| 0 1 0 0 | 1 |
| 0 1 0 1 | 2 |
| 0 1 1 0 | 3 |
| 0 1 1 1 | 4 |
| 1 0 0 0 | 5 |
| 1 0 0 1 | 6 |
| 1 0 1 0 | 7 |
| 1 0 1 1 | 8 |
| 1 1 0 0 | 9 |
| 1 1 0 1 | |
| 1 1 1 0 | |
| 1 1 1 1 | |

Figure 2:
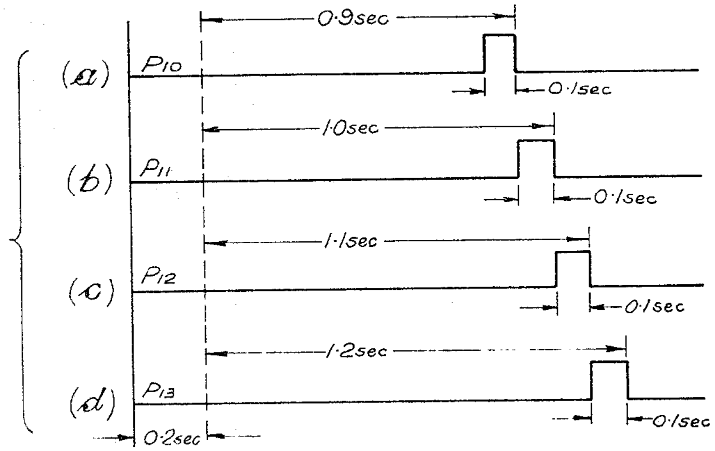
FIGS. 2 (*a-d*) illustrate wave forms at a point in the commutator generator of FIG. 1.

Output signals are taken off at the 7th through 10th outputs of the converter 14. These outputs are designated $P_{10}$, $P_{11}$, $P_{12}$ and $P_{13}$ respectively. As previously pointed out, the counter 12 is reset to zero and disabled for 0.2 seconds by the flipflop 18. Then the 10 HZ clock is used to dirve the counter 12 and a 0.1 second pulse will appear as the 7th output of the converter 14, 0.8 seconds after the counter 12 commences counting. Correspondingly, the $P_{11}$, $P_{12}$ and $P_{13}$ 0.1 second output pulses will be produced 0.9, 1.0 and 1.1 seconds after counter 12 commences counting. These waves forms are shown in FIGS. 2 (*a-d*) respectively.

Figure 6:
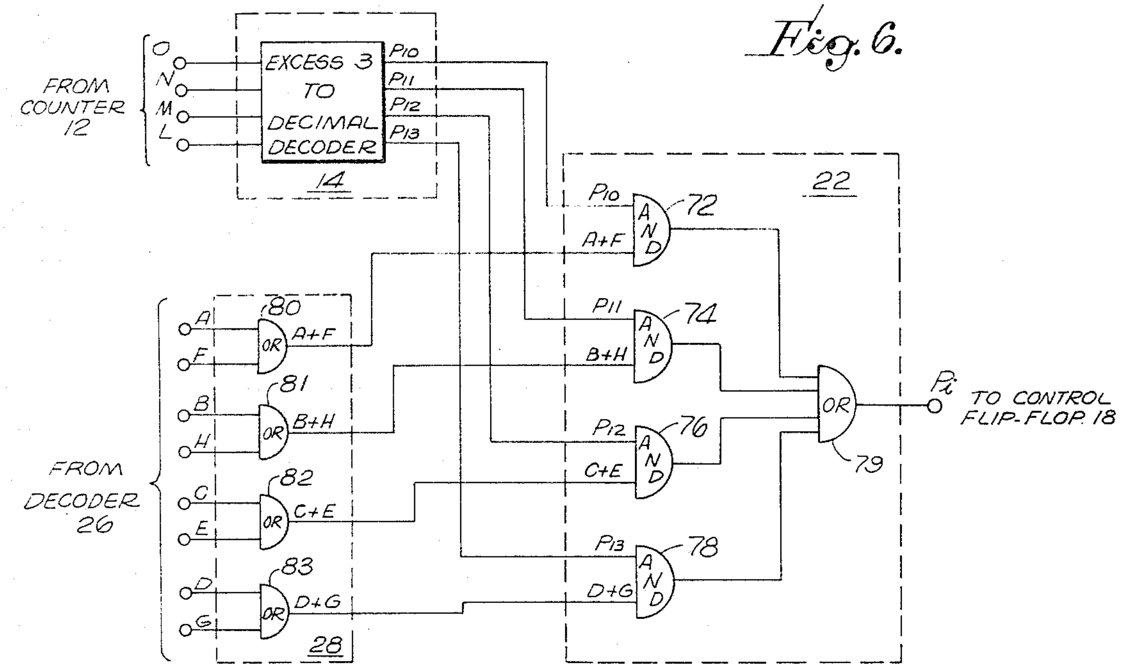
FIG. 6 shows the interconnections of a converter, OR gate circuit and control circuit used in the commutator generator of FIG. 1.

Referring now to FIG. 6, the converter 14, OR gate circuit 28 and control circuit 22 are shown in greater detail. Input signals from the terminals L, M, N and O are coupled to the input of converter and signals taken off at the 7th through 10th outputs of the converter and designated $P_{10}$, $P_{11}$, $P_{12}$ and $P_{13}$ respectively as previously mentioned. These outputs are then coupled to one of the input terminals of four AND gates 72, 74, 76 and 78 respectively.

Figure 3:
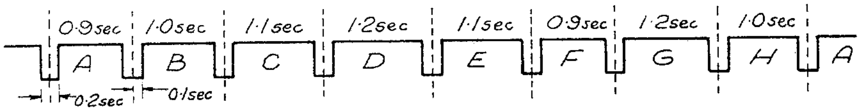
FIG. 3 shows a wave form of the transmission timing format of the OMEGA transmitting stations.

Referring now to FIG. 3, there is shown the transmission timing format of the eight OMEGA stations. It should be noted that there is 0.2 second delay between the transmission of adjacent OMEGA stations. In other words, Station A transmits for 0.9 seconds after which there is a 0.2 second delay and Station B will transmit. It should be further noted that Stations A and F, B and H, C and E, and D and G, each have the same transmission time of 0.9, 1.0, 1.1 and 1.2 seconds, respectively. Moreover, it should be noted that the stations of equal transmission time do not transmit subsequent to or prior to a station of equal transmission time. Thus, the stations having equal transmission timing can be readily identified by audio or visual techniques by comparing their envelopes with the envelopes of adjacent stations. Thus, for example, a station having a pulse width of 1.0 second can be readily identified as Station B rather than Station H.

Figure 4:
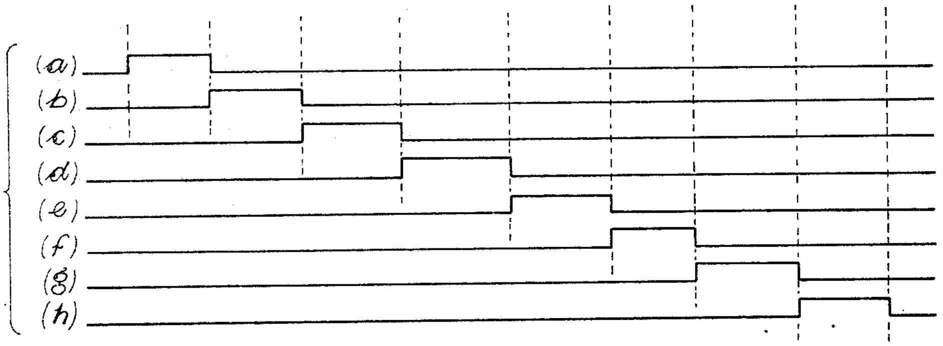
FIGS. 4 (*a-h*) depict wave forms of the timing stations.

Referring now to FIG. 4 (*a-h*), the timing gating signals associated with each of the Stations A-H are shown. These timing gating signals, normally referred to as "long" gates, each commence transmission 0.1 second prior to its associated station transmission and terminate 0.1 second after the station terminates transmission. The commutator generator of FIG. 1 generates these long gates at the output of the decoder 26 so that a receiver can be aligned with the OMEGA transmitting stations.

The eight long gate outputs from the decoder 26 are coupled to the OR gate circuit 28. The OR gate circuit, shown in FIG. 6, comprises four OR gates, 80, 81, 82 and 83, each having two input terminals and an output terminal. Each of the long gates having the same pulse width is coupled to an input terminal of the same OR gate. The output terminals of the OR gates 80, 81, 82 and 83 are coupled to the other input terminal of AND gates 72, 74, 76 and 78 respectively. The output terminals of AND gates 72, 74, 76 and 78 in turn are each coupled to an input terminal of an OR gate 79 of the control circuit 22. The output of the OR gate 79 is coupled to the control flipflop 18.

For the four inputs $P_{10}$, $P_{11}$, $P_{12}$, and $P_{13}$ from the converter 14 and the four inputs A+F, B+H, C+E and D+G from the OR gate 28, the output of the circuit 22, $P_i$ (the output of OR gate 79) may be expressed by the formula:

1. $P_i = P_{10}\ (A+F) + P_{11}\ (B+H) + P_{12}\ (C+E) + P_{13}\ (D+G)$

Figure 7:
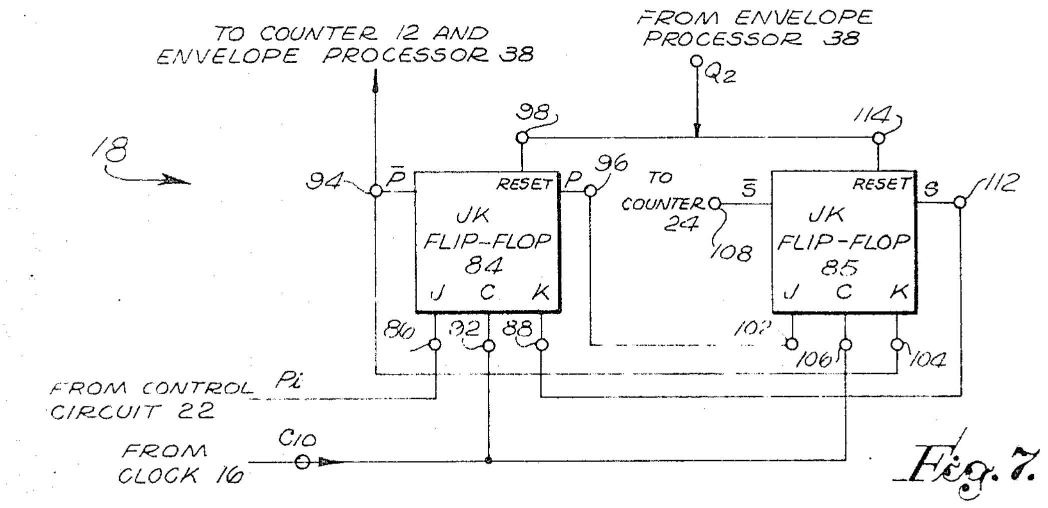
FIG. 7 depicts a control flipflop used in the commutator generator of FIG. 1 in greater detail.

Expanding this formula results in:

2. $P_i = P_{10} \cdot A + P_{11} \cdot B + P_{12} \cdot C + P_{13} \cdot D + P_{12} \cdot E + P_{10} \cdot F\ P_{13} \cdot G + P_{11} \cdot H$ Referring now to FIG. 7, there is shown the control flip-flop 18 in greater detail. The control flipflop which resets and provides a 0.2 second disabling signal for the binary counter 12 comprises a pair of conventional J K flipflops 84 and 85. The J K flipflop 84 comprises a pair of input terminals 86 and 88, and a clock input terminal 92. The flipflop 84 further comprises a pair of output terminals 94 and 96, and a reset terminal 98. The J K flipflop 85 is identical to the flipflop 84 and comprises input terminals 102 and 104, clock input terminal 106, output terminals 108 and 112, and reset terminal 114.

The output of the control circuit 22, $P_i$, is coupled to the input terminal 86 of flipflop 84. Further, clock pulses from the clock 16 are coupled to the clock input terminals 92 and 106. The output terminals 94 and 96 of flipflop 84 are coupled to the input terminals 104 and 102 respectively of flipflop 85. Also, the output terminal 112 of flipflop 85 is coupled to the input terminal 88 of flipflop 84. Moreover, reset terminals 98 and 114 are coupled to the envelope processor 38.

Figure 8:
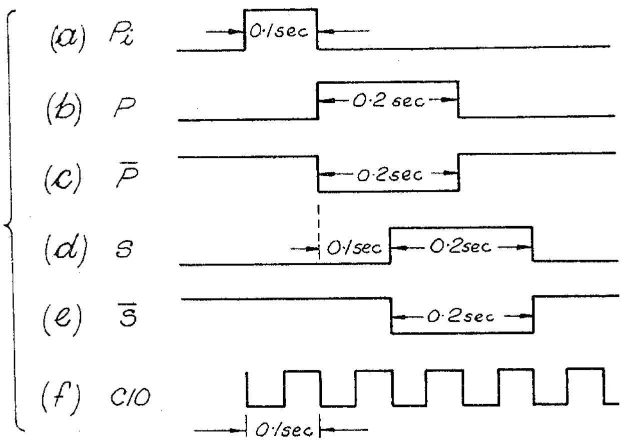
FIG. 8 illustrates waveforms at various points in the control flipflop of FIG. 7.

Referring now to the waveforms of FIG. 8, each time a pulse $P_t$ of FIG. 8(*a*) is applied to the input terminal 86, the trailing edge of clock pulse C10 of FIG. 8(*f*) sets $P$ at terminal 96 to a 1 and $\overline{P}$ at terminal 94 to a 0. Output P is coupled to input terminal 102 and the next trailing edge of clock pulse C10 (which occurs 0.1 second later) sets the output S at terminal 112 to 1. The output 1 at terminal 112 is coupled to terminal 88. With a 0 at terminal 86 and a "1" at terminal 88, the trailing edge of the next clock pulse causes the flipflop 84 to reset changing P to 0 and $\overline{P}$ to 1. Finally, the $\overline{P}$ 1 signal is applied to terminal 104 and the signal S at terminal 112 changes to 0 and the flipflop returns to its original state.

Thus, as can be readily seen, the output at terminal 94, $\overline{P}$, provides a 0.2 sec 0 pulse at the counter 12 each time a pulse, $P_t$, is applied to the input of the control flipflop 18. This 0.2 second pulse causes the flipflops 52, 54, 56 and 58 to be reset. At the termination of the pulse, the counter 12 resumes its count. Further, it should be noted that a signal Q2 is applied to the reset terminals 98, 114 of the flipflops from the envelope processor 38. The signal Q2 is applied to reset the flipflops when the commutator generator is initially being synchronized, as will be explained hereinafter.

Figure 9:
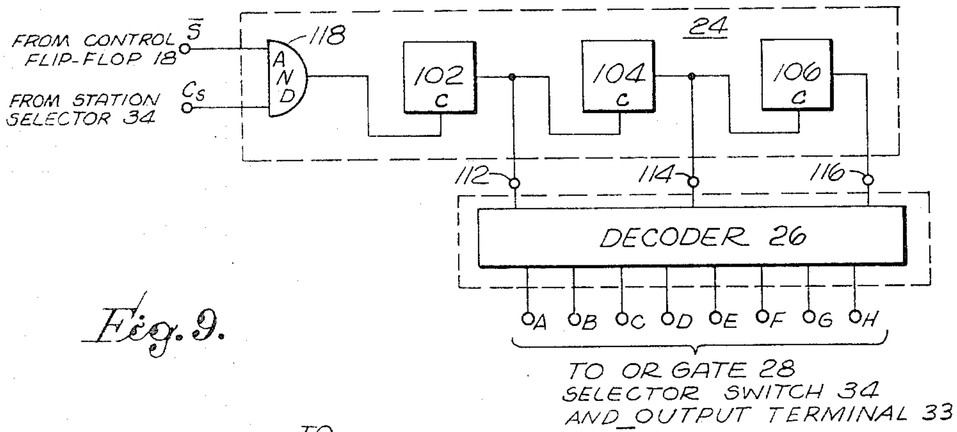
FIG. 9 show the interrelationship of an output counter and decoder used in the commutator generator of FIG. 1.

Referring now to FIG. 9 the counter 24 is shown in greater detail. The counter is a 3-stage binary counter formed of J K flipflops 102, 104 and 106 connected in cascade. Output signals at the output terminals 112, 114 and 116, respectively, of the flipflops are coupled to the decoder 26.

Input signals to the clock terminal of flipflop 102 are coupled from an AND gate 118. The input signals to the AND gate are $C_s$, from the station selector 34, which will be explained in greater detail hereinafter. The other input signal to the AND gate 118 is the signal $\overline{S}$, present at the output terminal 108 of the flipflop 85. As will be remembered with respect to the wave forms of FIG. 8, $\overline{S}$ is delayed with respect to $P_t$ by 0.2 second. In normal counting sequence, the signal Cs is normally 1, Thus, the output of AND gate 118 is controlled by the signal $\overline{S}$. Each time a pulse $P_t$ appears, $\overline{S}$ goes to 0 0.1 second later, advancing the counter one count.

The three-stage counter 24 counts from 0 to 7 and each output is assigned to one of the gates of each OMEGA station. The output terminals 112, 114 and 116 are coupled to the binary to decimal decoder 26.

The output of the counter is coupled to the binary to the decimal decoder 26 having a truth table as follows:

| Output of Counter 24 | Station Assigned | Decoder 26 Output Gate Pulse Width (Seconds) |
|---|---|---|
| 000 | A | 1.1 |
| 001 | B | 1.2 |
| 010 | C | 1.3 |
| 011 | D | 1.4 |
| 100 | E | 1.3 |
| 101 | F | 1.1 |
| 110 | G | 1.4 |
| 111 | H | 1.2 |

The decoder 26 generates a signal having a pulse width shown on the above chart. Thus, if the output of counter 24 is 000 or 101, the output of decoder 26 would have a pulse width of 1.1 seconds. Output signals from the decoder 26 provide the gating signals for the receiver and additionally are coupled to the OR gate 28, the selector switch 34 and output terminal 33.

Figure 10:
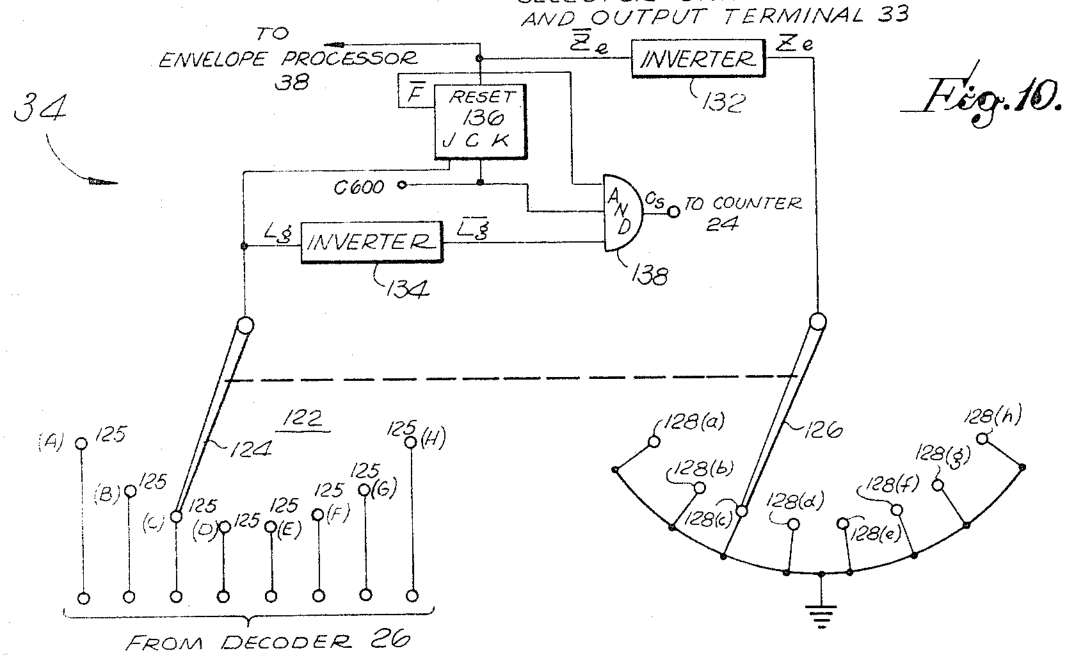
FIG. 10 depicts a station selector used in the commutator generator of FIG. 1 in greater detail.

Referring now to FIG. 10, the station selector 34 is shown in greater detail. The station selector initially presets the counter 24 to the desired state by use of a selector switch 122. The selector switch 122 comprises a rotary arm 124, one end of which is selectively coupled to one of eight terminals 125 (A-H). The other end of the terminals are coupled to the eight output terminals of the decoder 26 whose outputs are the long gates A-H respectively.

The arm 124 is ganged to a rotary arm 126, one end of which may be selectively coupled to one of the eight terminals 128 (*a-h*) in tandem with the movement of the arm 124 to the terminal 125 (A-H) respectively. Further, each of the terminals 128 (*a-h*) is connected to a source of zero potential or ground.

The other end of the arm 126 is connected to an input side of an inverter 132 so that when the arm 126 is connected to one of the terminals 128 (*a-h*), the signal represented by the symbol Ze appearing at the input side of the inverter will be a 0 and the signal represented by the symbol $\overline{Z}$e appearing at the output side of the inverter will be a 1. Conversely, when the arm 124 is moved to select one of the terminals 125 (A-H), the arm 126 will instantaneously not be connected to ground and the signal $\overline{Z}$e will be 0 . The output of inverter 132 is fed to the reset terminal of flipflop 136.

The other side of the arm 124 is connected to one side of an inverter 134 whose input signal is represented by the symbol Lg and whose output is represented by the symbol $\overline{L}$g. The other side of arm 124 is also connected to the input terminal of a J K flipflop 136. Connected to the clock or trigger terminal of the flipflop 136 is a clock which is of a higher magnitude of frequency than the clock 16. Typically, the clock signal could be of 600 HZ and this clock source could be divided by 60 to produce the 10 HZ clock source 16. An output terminal of the flipflop 136 whose output signal may be represented by the symbol $\overline{F}$ is connected to one of the three input terminals of an AND gate 138. Connected to the other AND gate input terminal is the output terminal of inverter 134 and the 600 HZ clock source which is represented by the symbol C600. The output signal of the AND gate 138 is represented by the symbol Cs and the logic for the AND gate is:

$$Cs = \overline{F} \cdot C600 \cdot \overline{Lg}$$

The station selector sets the counter 24 and in turn the decoder 26 to a predesired station long gate. Then when the commutator generator is activated the correct synchronization of the system occurs. The arm 124 is moved to the position 0corresponding to the OMEGA station whose signals are present in the receiver area. This station could be known from experience or actually heard by audio techniques.

Movements of the arm 124 in turn causes arm 126 to be momentarily disconnected from ground. At that instant $\overline{Z}$e goes to 0 and forces $\overline{F}$ to be 1. If the decoder 26 output station selected by the arm 124 was not the station that the decoder was already positioned to, then the signal Lg will be 0 and $\overline{L}$g will be 1. The AND gate 138 will then pass the C600 signal to the counter 24.

When the decoder output reaches the station selected by the arm 124, Lg will become 1, $\overline{Lg}$ switches to 0 disabling the 600 HZ signal from the AND gate 138 output, and a half clock cycle later $\overline{F}$ becomes 0 and disables the AND gate until the next disturbance on the station selector switch. However, output of the AND gate 138 remains at 1 and, therefore, the AND gate 118 of the counter 24 is controlled by the signal $\overline{S}$.

Moreover, it should be noted that if initially the arm 124 is already at the position corresponding to the station selected, the arm must be momentarily moved from this position and then returned in order to allow the signal to the inverter 132, Ze to be momentarily 1 as previously explained.

Moreover, it should be noted that if the decoder 26 output is already at the station selected, Lg will be 1, and $\overline{Lg}$ will be zero and the 600 HZ signal will not pass through the AND gate 138.

Figure 11:
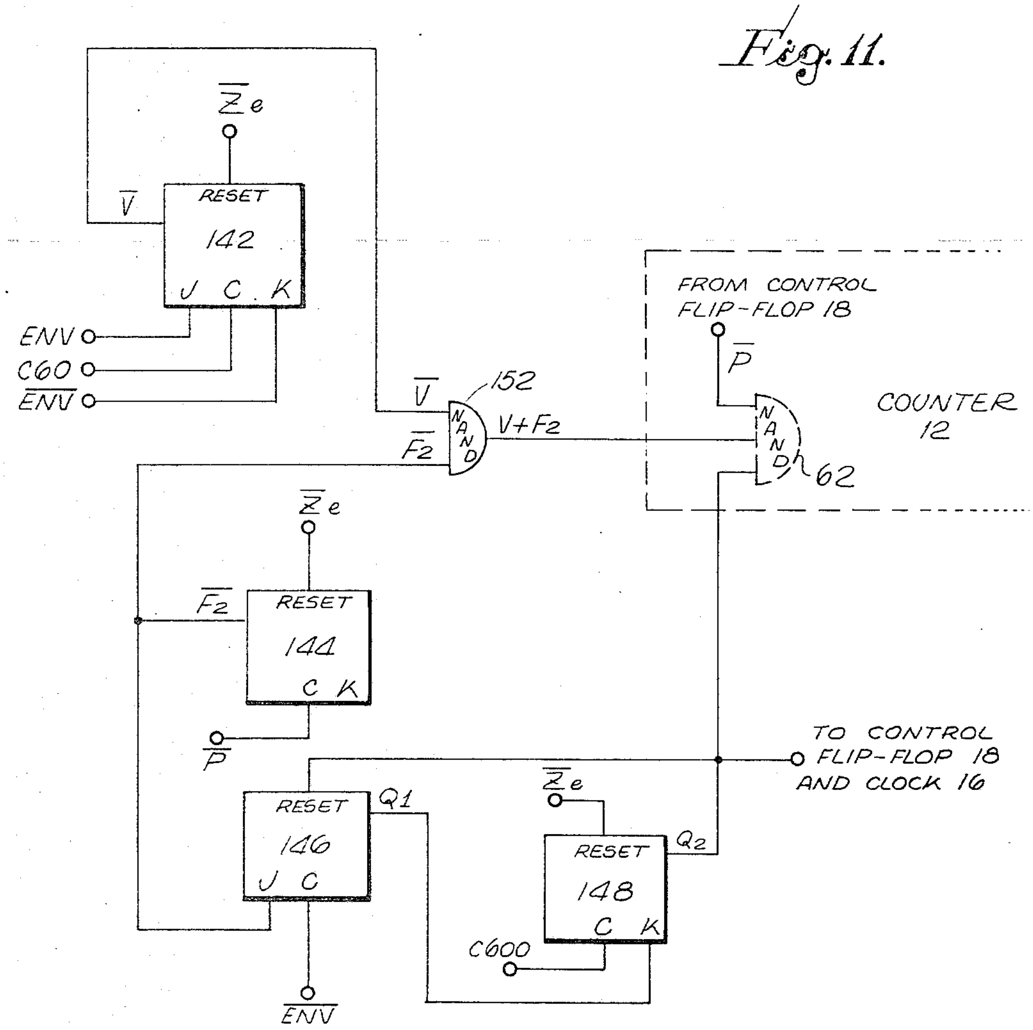
FIG. 11 illustrates an envelope processor used in the commutator generator of FIG. 1 in greater detail.

Referring now to FIG. 11, the envelope processor 38 is shown in greater detail. The main purpose of the envelope processor is to provide an enabling signal for the binary counter 12.

The envelope processor comprises four JK flipflops 142, 144, 146 and 148. When arm 124 of the station selector is moved $\overline{Ze}$ goes to 0 momentarily. The signal $\overline{Ze}$ of the station selector 34 is coupled to the reset terminals of the flipflops 142, 144, and 148, clearing these flipflops. Further the flip-flop 148 output signal designated as Q2 goes to 0 and is coupled to the reset terminal of flipflop 146, clearing the flipflop 146 as well. The output Q2 is also coupled to an input terminal of the NAND gate 62 of counter 12.

Further, as previously pointed out in the description of the control flipflop 18, the output of flipflop 84, $\overline{P}$, is coupled to the counter 12, also at an input terminal of NAND gate 62. As will be remembered, $\overline{P}$ is normally 1 except for 0.2 sec after $P_t$ is present. Thus, with the commutator generator not operating, $\overline{P}$ is 1.

With the flipflops 142 and 144 cleared, the output signals of these flipflops represented by the symbols $\overline{V}$ and $\overline{F2}$ respectively are 1. These signals are coupled to an input terminal of a NAND gate 152.

The output of the NAND gate is $\overline{\overline{V}.\overline{F2}}$ or V+F2.

The output of the NAND gate 152, V+F2, is also coupled to an input terminal of the NAND gate 62.

Since $\overline{V}$ and $\overline{F2}$ are 1, V and F2 are 0 and the output of NAND 62 remains 1 and the flipflops 52, 54, 56 and 58 of the counter 12 remain disabled.

The detected OMEGA station signal to which the arm 124 has been set is received by the OMEGA reciever 32. The signal in turn is coupled to the envelope detector 34. The output of the detector 34 is the OMEGA station envelope of the selected station. (The envelope of all the stations is shown in FIG. 3). The envelope signal is represented by the symbol $\overline{ENV}$ and is coupled to one input terminal of the flipflop 142. Further, an inverted envelope signal represented by the symbol ENV is coupled to the other input terminal of the flipflop 142.

The flipflop 142 provides a 15 millisecond delay for synchronizing the clock 16 with the envelope. The detected envelope may be either a few milliseconds wider or narrower than the actual transmitted time. The clock source for the flipflop 142 is a 60 HZ signal which is represented by the signal C60 and can be obtained by dividing the 600 HZ clock source by 10. The use of the 60 HZ clock source provides the 15 millisecond desired delay, whereas should the 60HZ be used, only a 1.5 millisecond delay would be provided and the 10 HZ clock source would provide too long a delay.

When the arm 124 is placed on a contact again and $\overline{Ze}$ goes to 1, flipflop 148 output Q2 goes to 1 as the flipflop is triggered by the 600 HZ clock coupled to the clock terminal. Since Q2 is a 1, the flipflop 146 can be triggered by the signal $\overline{ENV}$ which is coupled to its clock terminal.

Further, since the inputs to the NAND gate 62, $\overline{P}$ and Q2, are now both 1, the output of this gate is basically controlled by the output of the NAND gate 152 which is V+F2.

When the OMEGA station signal envelope is coupled to the envelope processor 38, the signal $\overline{ENV}$ becomes 0 and the output signal Q1 of flipflop 146 becomes 1. The output signal Q1 is coupled to an input terminal of flipflop 148 and the output signal Q2 becomes 0 for one 600 HZ cycle. Output signal Q2 is coupled to the clock 16 and operates to synchronize the clock with the detected envelope.

When the signal ENV becomes 1 at the presence of the envelope, flipflop 142 changes its state so that $\overline{V}$ becomes 0. The output of NAND gate 152 is 1 and with all 1 's to the input of NAND gate 62, the output of the gate 62 is 0 and the binary counter 12 starts to count.

With the correct envelope coupled to the envelope processor, the output signal $P_t$ will appear at the control circuit 22, and $\overline{P}$ will become 0 for 0.2 seconds, as shown in the waveforms of FIG. 8. When $\overline{P}$ goes to 0, it triggers flipflop 144 and $\overline{F2}$ goes to 0. The output of NAND gate 152 will then remain at 1 until the arm 124 is moved causing the flipflop 144 to reset.

The flipflop 142 will follow each detected envelope but it does not affect the counter 12, since $\overline{F2}$ is at 0 and controls the output of the NAND gate 152. Further, it should be noted that with the signal $\overline{F2}$ at 0, flipflop 146 and flip-flop 148 cannot change states and thus cannot be triggered by the signal $\overline{ENV}$.

Thus, once $\overline{P}$ triggers the flipflop 144, the envelope processor no longer controls the binary counter 12 and the counter can only be reset by the signal $\overline{P}$ from control flipflop 18.

Each time a signal, $P_t$, is present at the output of circuit 22, the counter 24 advances one count 0.1 second later as the signal $\overline{S}$ goes to 0. Simultaneously, the control flipflop 18 is actuated by the signal $P_t$ to clear counter 12 and simultaneously disable it for 0.2 seconds. As an example, should the output signal at OR gate 28 be gate A, an output signal $P_t$ will be produced at the control gate 22, when the output of converter 14 is $P_{10}$. (See Formula (2) ).

With $P_{10}$ at the output of control circuit 22, counter 24 is advanced by one count and the output of decoder 26 and OR gate 28 is gate B. Simultaneously, the control flipflop 18 resets counter 12 and disables it for 0.2 seconds. As soon as the two clock cycle time has elapsed, the binary counter 12 resumes its normal countdown sequence. When $P_{11}$ is the output of the converter 14, the control circuit output $P_t$, which is $P_{11}$, advances the counter 24, the control flipflop 18 is triggered and the cycle repeated until all the gates of FIG. 4 (A-H) have been generated. Then the cycle is repeated.

If two relatively strong signals are received, then the widest of the two signals must be selected. Thus, for example, should the receiver by geographically located so that it receives signals of approximately equal strength from OMEGA transmitting stations B and C, the arm 124 should be set to station C. This position of the arm will cause counter 24 to be set to an output code representative of station C or 010. The counter 24 is used to select the proper $P_t$ out of the converter 14 as previously explained. This $P_t$ is in turn used to change the state of counter 24.

If the arm 124 is selected for the narrower station pulse B and the counter 12 is enabled by the wider envelope station pulse C, the commutator generator will not be in synchronization. Thus, for example, when arm 124 is selected for Station B, and the counter 12 is enabled by Station C, in accordance with Formula (2), an output signal $P_t$ will be produced when converter 14 output reaches $P_{11}$.

The envelope detector 36 identifies the strong OMEGA station signals and provides a station envelope from the R.F. output stage of the OMEGA receiver 32. The envelope detector normally comprises a rectifier which rectifies the R.F. signal and produces the station envelope. Further, the output of the rectifier could be coupled to a voltage comparator to determine if the envelope has a sufficient signal level to activate the envelope processor 38 as well as clear the station envelope.

Moreover, it should be understood that in cases where the large amounts of noise are present and a clear station envelope cannot be detected, the 10.2KHZ R.F. OMEGA station signal can convert into an audible signal of 2.04KHZ by means of a filter network. In this instance, the operator could interject a simulated station envelope into the envelope processor so as to activate the commutator generator.

I claim:

1. A system for generating a series of gating signals which correspond to and are synchronized with gating signals for a radio navigation system transmitted from a plurality of radio transmitting stations comprising:

means for receiving and detecting the transmitted gating signals, a clock pulse generator, an input counter receiving the output of said pulse generator and providing a pulse count in response thereto, converter means receiving the output of the counter for generating a series of sequential pulses in response to said output, each of said pulses being delayed from the initiation of the count of said counter by an amount corresponding to the time duration of at least one of the transmitted gating signals, control circuit means receiving the output of said converter means for generating a control signal corresponding to each of said gating signals and synchronized with a corresponding one of the pulses from the converter means, an output counter receiving the output of said control circuit means and providing a pulse count in response thereto, decoder means for receiving the pulse count output of the output counter and generating a series of gating signals corresponding to the gating signals of said navigation system, the output of said decoder means being fed to said control circuit means for synchronization with the pulse output of said converter means, selector means receiving the outputs of said decoder means for selecting one of the gating signals, the output of said selector means being fed to said output counter to synchronize the output counter with the selected gating signal, and processor means connected to said receiving and detecting means for receiving the detected gating signa corresponding to that selected by said selector means and providing a signal in response thereto for resetting said input counter to zero, thereby synchronizing the input counter with the detected gating signal.

2. The system of claim 1 wherein said gating signals comprise pairs of such signals, each such pair having the same pulse duration, said control circuit means comprising a separate AND gate for receiving each pair of said signals and one of the pulses from said converter means and an OR gate for receiving the outputs of all of said AND gates.

3. The system of claim 1 wherein said input counter comprises a binary counter, said converter means comprising a decimal decoder for decoding the output of said binary counter to decimal form.

4. The system of claim 1 wherein said output counter comprises a binary counter, said decoder means comprising a binary to decimal counter for converting the binary output of said output counter to a series of gating signals corresponding to those of said navigation system.

5. The system of claim 1 wherein said processor means further provides a signal for synchronizing the clock pulse generator with the detected gating signal.

* * * * *